3,375,420
RARE EARTH FLUORIDE CAPACITORS
Arden Sher and Raymond Solomon, Sunnyvale, Calif., assignors to Varian Associates, Palo Alto, Calif., a corporation of California
Filed Aug. 8, 1966, Ser. No. 571,097
4 Claims. (Cl. 317—258)

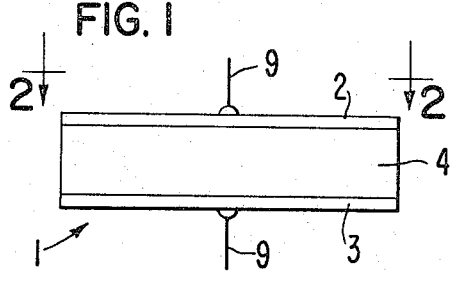
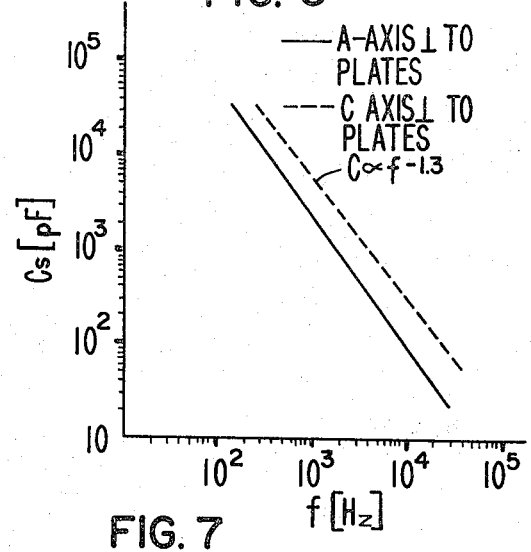
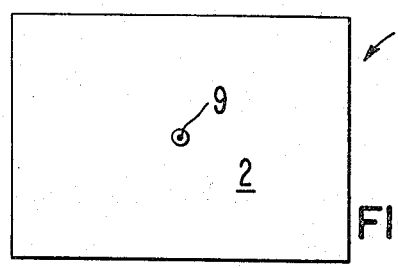
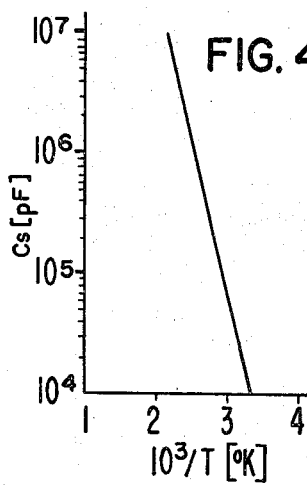
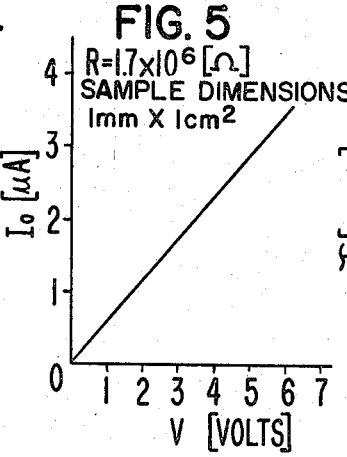
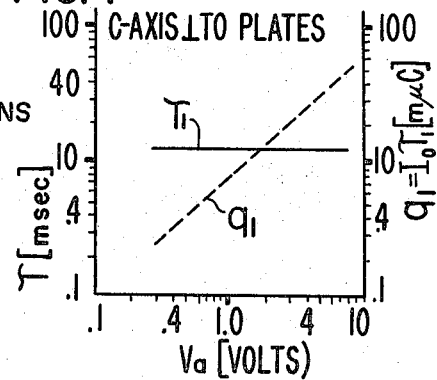
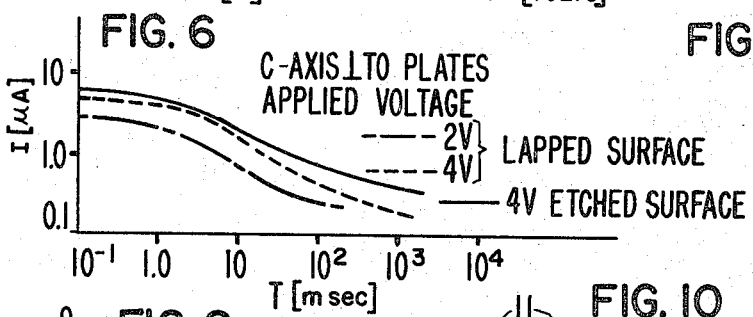
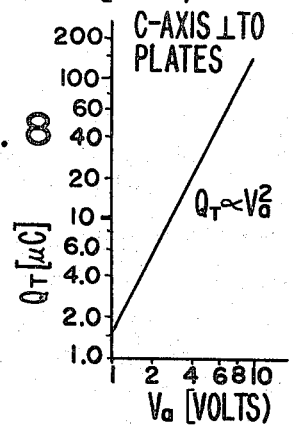
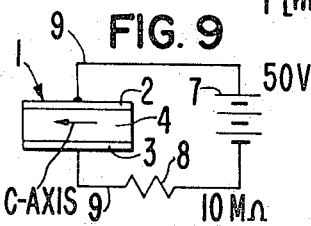
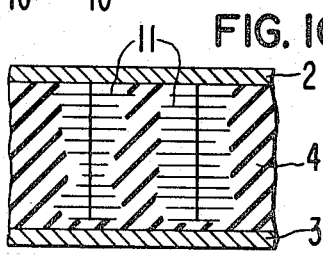
INVENTORS
ARDEN SHER
RAYMOND SOLOMON United States Patent Office 3,375,420
Patented Mar. 26, 1968

ABSTRACT OF THE DISCLOSURE

An electric capacitor is disclosed employing a lanthanum series rare earth fluoride dielectric material. The dielectric material is preferably a trifluoride substance including a multitude of metallic dendrites extending in a direction from one of the electrodes of the capacitor toward the other one of the electrodes for increasing the capacitance of the capacitor. In a preferred embodiment, the dielectric is preferably made of a single crystal of hexagonal configuration oriented with its C-axis extending in a direction which is not perpendicular to both electrodes. A method for growing the dendrites in the single crystal dielectric material is disclosed wherein a static voltage in excess of 10 volts is applied across the electrodes of the capacitor for a time in excess of a few hours.

The present invention relates in general to electrical capacitors and, more particularly, to capacitors employing the rare earth fluorides as the dielectric medium to provide increased capacitance per unit volume at low frequencies or D.C., whereby the size of relatively low voltage capacitors may be substantially reduced.

In the present invention, it has been discovered that the rare earth fluorides of the lanthanide series exhibit an exceptionally large electric polarization effect, thereby making them especially useful as the dielectric medium of electric capacitors for reducing the size of such capacitors. Indeed, a capacitor formed by a pair of electrodes on opposite sides of a disk of $LaF_3$ 1 mm. thick and 1 cm. square provides a capacitance of 1 µf. at 1 volt to 10 µf. at 10 volts/ at D.C. frequencies.

The principal object of the present invention is the provision of an improved electric capacitor.

One feature of the present invention is the provision of an electric capacitor having its dielectric medium selected from the class consisting of the lanthanide series of rare earth fluorides, whereby the physical size of the capacitor is minimized.

Another feature of the present invention is the same as the preceding wherein the dielectric medium is selected from the sub class of $LaF_3$, $CeF_3$, $PrF_3$ and $NdF_3$, whereby fabrication of the capacitors is facilitated.

Another feature of the present invention is the same as any one or more of the preceding features wherein the dielectric medium contains metallic dendrites extending in the direction from one electrode toward the opposed electrode of the capacitor, whereby the capacitance of the capacitor is substantially increased.

Another feature of the present invetntion is the method of growing dendrites in the dielectric medium by applying a D.C. voltage in excess of 10 volts to the dielectric medium for a period of at least several hours.

Other features and advantages of the present invention will become apparent upon a perusual of the following specification taken in connection with the accompanying drawings wherein:

FIG. 1 is a side view of a capacitor of the present invention,

FIG. 2 is a plan view of the structure of FIG. 1 taken along line 2—2 in the direction of the arrows, FIG. 3 is a plot of capacitance versus frequency for the capacitor of FIG. 1, FIG. 4 is a plot of capacitance versus inverse temperature at 1000 Hz for the capacitor of FIG. 1.

FIG. 5 is a plot of discharge current versus applied voltage for the capacitor of FIG. 1, FIG. 6 is a plot of discharge current versus time, FIG. 7 is a plot of time constant and stored charge versus applied voltage, FIG. 8 is a plot of stored charge versus applied voltage at 30° C. for the capacitor of FIG. 1, FIG. 9 is a circuit diagram depicting the method of growing dendrites for increased capacitance, and FIG. 10 is a schematic magnified diagram of a metallic dendrite in the dielectric medium of the capacitor of the present invention.

Referring now to FIGS. 1 and 2 there is shown an electrical capacitor 1 of the present invention. More particularly, the capacitor 1 includes a pair of electrically conductive electrodes 2 and 3 as of gold which are vacuum deposited to a thickness of at least 1 micron on opposite sides of a dielectric member 4. Alternatively, the electrodes may comprise silver paint or other conducting materials. The dielectric medium 4 is selected from the class of rare earth lanthanide series fluorides. For example, the trifluorides of the lanthanide series, defined by rare earth elements having atomic numbers 57 to 71, inclusive are suitable dielectric materials. $LaF_3$, $CeF_3$, $PrF_3$ and $NdF_3$ are especially desirable because these fluorides are more easily produced than the other fluorides due to certain troublesome phase changes which occur in the growth of the other fluoride crystals at the typical growing temperatures.

The static dielectric constant for the dielectric material 4 of capacitor 1 is enormous in comparison with other prior art materials such as barium titanate. For example, the application of a one volt potential across a single crystal wafer of dielectric 4 0.1 cm. thick at room temperature results in a polarization charge density of approximately $10^{-6}$ coulombs/cm.$^2$ (an effective static dielectric constant of $10^{-6}$).

It has been found that the capacitance of a capacitor 1 of the present invention is substantially increased, as by, for example, a factor of 10, by growing metallic dendrites in the dielectric medium 4. In the case of a single crystal of $LaF_3$ the crystal has a basically hexagonal configuration and dendrites will grow in a plane which is perpendicular to the C-axis of the crystal. The crystal is oriented between the electrodes 2 and 3 such that the C-axis of the crystal is parallel to both electrodes 2 and 3 to align the plane of dendrite growth in the direction from one electrode 2 toward the other 3. A voltage in excess of 10 volts, such as 50 volts, is applied across the electrodes 2 and 3 as derived from a battery 7 via a current limiting resistor 8, as of 10MΩ, and leads 9. The growing of the dendrites may be done at room temperature and at such temperature 24 hours is sufficient to grow the required number of metallic lanthanum dendrites in the dielectric slab 4. Less time would be required at higher temperatures. The dendrites 11 take the form of metallic tree-like structures in the crystal 4, as shown in FIG. 8, which extend from one electrode 2 toward the other 3. If a dendrite grows through from one electrode 2 to the opposed electrode 3 it forms a short circuit path which breaks apart like a fuze, internally of the crystal upon completion of the microscopic electrical circuit. Thus, the dendrites 11, which do grow through, do not short out the dielectric medium 4. It is believed that the increase in capacity of the capacitor 1 with dendrites is due to the effective increase in the surface area of the electrodes due to the interleaved surface area of the dendrites.

Various characteristics for the capacitor 1 of the present invention have been measured. Most of these measurements, which are shown in FIGS. 3–8, were made on a capacitor 1 having a dielectric medium 4, 1 mm. thick and one centimeter square. A single crystal of $LaF_3$ was used as the dielectric 4 for most of these measurements.

However, other measurements made on other ones of the lanthanide series trifluorides show that these results are characteristic of the aforesaid series.

FIG. 3 shows a plot of the series capacitance of the capacitor 1 as a function of frequency for $LaF_3$ crystals oriented perpendicular to the C-axis and A-axis. In general $C_S$ is proportional to $f^{-n}$ where $n$ lies between 0.3 and 1.5. The exponent appears to depend on sample preparation, and no obvious differences can be observed between C-axis and A-axis oriented crystals. The saturation of the capacitance at low frequencies has been observed in all the crystals measured. The series resistance is relatively constant over the measured frequency range.

The series capacitance measured at 1 Hz, is shown in FIG. 4 as a function of temperature. $C_S$ follows an activation law for temperatures up to about 200° C., with an activation energy of about 0.5 ev. The behavior of the series resistance is more complicated, with two different activation regions discernible.

Referring now to FIG. 5, one readily measured phenomenon for capacitors 1 of the present invention is the time-dependent behavior of the discharge current into a load. The current starts off at an initial value $I_0$, and then decays with time to zero.

The initial current $I_0$ obeys Ohm's law very well, as can be seen in FIG. 5.

A log-log plot of the depolarization current vs. time for two charging voltages and surface preparations is shown in FIG. 6. The decay cannot be fitted by a $t^{-n}$ relationship such as has been observed in other materials. The decay fits over about six decades of time with a sum of exponentials. The time constants differ by about an order of magnitude for the short times and by about a factor of two for long times. Although another analytic function may very possibly fit the data equally well, the fact that the time constants are fairly widely spaced gives some confidence that a sum of exponentials is a reasonably good description of the decay.

To a fairly good approximation the first time constant can be obtained from the initial slope of the decay, i.e.

$$\frac{1}{\tau_1} \simeq \frac{1}{I_0} \frac{dI}{dt}\bigg|_{t=0}$$

FIG. 7 shows plots of $\tau_1$ and $I_0\tau_1 = q_1$ vs. applied voltage. The initial decay behaves like a true capacitor discharge, i.e. the stored charge ($q_1$) is linearly proportional to the applied voltage. The capacitance $C_1$ obtained from the slope of FIG. 7 is $7.3 \times 10^{-9}$ F., and the effective width of the capacitance, given by $d_1 = \kappa\epsilon_0 A/C_1$, is $2 \times 10^{-4}$ cm. The capacitance $C_1$ has also been measured for a range of sample thicknesses. Although there is a fair amount of scatter due to the difficulty of obtaining reproducible surfaces, $C_1$ was found to be essentially independent of thickness.

The total polarization charge, defined as $$Q_T = \int_0^\infty I\,dt = \int_0^\infty \sum_i I_i e^{-t/\tau_i} dt = \sum_i I_i \tau_i$$

is shown in FIG. 8 as a function of applied voltage, where the coefficients $I_i$, $\tau_i$ are obtained by fitting the current decay to a sum of exponentials. Unlike the charge associated with the first time constant, the total stored charge $Q_T$ varies as the square of the applied voltage. Plotting the individual time constants against voltage resulted in too much scatter to draw definite conclusions; however, the charges associated with the longer time constants, at least, appeared to follow the same $V^2$ relation.

The effect of surface treatments on the current decay was also investigated. In these tests samples were lapped, then polished, and finally etched in boiling $H_2SO_4$, with current decay measurements made after each step. In addition, other surface treatments were applied, e.g. $HNO_3$ soak, HF soak, exposure to water vapor, etc. The results of these tests show that:

(a) The polarization current is of the same order of magnitude for lapped, polished, and etched surfaces (see FIG. 6).

(b) The values of the time constants change after each surface treatment, although not in a reproducible way.

(c) Soaking in $HNO_3$ and HF caused smaller but still observable changes.

(d) Soaking in water or exposure to water vapor did not result in obvious changes.

(e) Applying electrodes by various techniques did not produce obvious changes.

(f) Aging the sample in air for several weeks caused an increase in time constants.

(g) Exposure to visible and UV radiation had no effect.

In summary, some of the important characteristics of the capacitor 1 are:

(1) The capacitance $C_1$, as obtained from the initial slope of the current decay, is independent of voltage from the maximum prebreakdown voltage ($\sim$10 V.) down to very low voltages ($\sim$10 mv.).

(2) If the crystal is open circuited for $\gtrsim 0.5$ sec. before it is completely discharged and then short circuited again, $C_1$ has the same value as that determined from the initial decay.

(3) The static capacitance, $C_T$, derived from the total stored charge divided by the applied voltage, is directly proportional to the applied voltage.

(4) Both the static capacitance $C_T$ and the initial capacitance $C_1$ are affected by chemical treatments and by storage in air.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electrical capacitor, means forming a pair of electrically conductive electrodes, means forming a dielectric medium disposed between said pair of electrodes, said dielectric medium being a lanthanum series rare earth fluoride, the improvement wherein, said dielectric medium includes a multitude of metallic dendrites extending in a direction from one of said electrodes toward the other one of said pair of electrodes, whereby the capacitance of the capacitor is increased.

2. The apparatus of claim 1 wherein said rare earth fluoride is a trifluoride.

3. The apparatus of claim 1 wherein said dielectric medium is a single crystal of basically hexagonal configuration oriented with its C-axis extending in a direction which is not perpendicular to both electrodes, whereby the capacitance of the capacitor is increased.

4. The method for increasing the capacitance of a capacitor having a pair of electrically conductive electrodes and a lanthanum series rare earth fluoride dielectric material disposed therebetween comprising the steps of, orienting the single crystal of basically hexagonal configuration with its C-axis extending in a direction which is not perpendicular to both electrodes, applying a static voltage in excess of 10 volts across a pair of electrodes of the capacitor for a time in excess of a few hours such that metallic dendrites are caused to grow within the rare earth lanthanide series rare earth fluoride dielectric medium in a direction from one electrode toward the other, thereby increasing the capacity of the capacitor.

References Cited

UNITED STATES PATENTS

| | | | |
|---|---|---|---|
| 1,871,269 | 8/1932 | Hobrock | 317—242 |
| 3,271,192 | 9/1966 | Thun | 317—258 X |

LARAMIE E. ASKIN, *Primary Examiner.*

E. GOLDBERG, *Assistant Examiner.*